US 11,847,888 B2

(12) United States Patent
Shigeta

(10) Patent No.: US 11,847,888 B2
(45) Date of Patent: Dec. 19, 2023

(54) GAME TOKEN MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 17/583,816

(22) Filed: Jan. 25, 2022

(65) Prior Publication Data

US 2022/0148382 A1 May 12, 2022

Related U.S. Application Data

(63) Continuation of application No. 17/036,616, filed on Sep. 29, 2020, now Pat. No. 11,263,868, which is a (Continued)

(30) Foreign Application Priority Data

Feb. 1, 2016 (JP) .................................. 2016-030443

(51) Int. Cl.
*G07F 17/32* (2006.01)
*A63F 1/06* (2006.01)
(Continued)

(52) U.S. Cl.
CPC ............ *G07F 17/3248* (2013.01); *A63F 1/06* (2013.01); *A63F 3/00157* (2013.01); (Continued)

(58) Field of Classification Search
CPC ............. G07F 17/3248; G07F 17/3206; G07F 17/3209; G07F 17/322; G07F 17/3241; (Continued)

(56) References Cited

U.S. PATENT DOCUMENTS 4,026,309 A   5/1977   Howard
4,814,589 A   3/1989   Storch et al.
(Continued)

FOREIGN PATENT DOCUMENTS

AU   2013266362 A1   11/2014
CN     101622137 A    1/2010
(Continued)

OTHER PUBLICATIONS

Korean Office Action dated Mar. 18, 2022 issued in KR application No. 10-2020-7035877 cites the patent documents above.
(Continued)

*Primary Examiner* — Pierre E Elisca
(74) *Attorney, Agent, or Firm* — NORTON ROSE FULBRIGHT US LLP

(57) ABSTRACT

According to the present invention, there is provided a management system that prevents misuse of many game tokens during the operation of casino using card game tables in casino and other card game facilities using card game tables. The management system has a function that previously registers IDs of contemplated game tokens on database, manages IDs of game tokens present on a game table chip tray and a storage together with information on location on database, specifies the game token in the game table chip tray and the storage at predetermined timing, and generates an error signal when the following statuses is noticed: 1) a fact that ID absent on database is newly present and 2) a fact that two or more identical IDs are present.

8 Claims, 5 Drawing Sheets

Related U.S. Application Data continuation of application No. 16/073,913, filed as application No. PCT/JP2017/002342 on Jan. 24, 2017, now Pat. No. 10,861,284.

(51) Int. Cl.
| | | |
|---|---|---|
| *G01B 11/06* | (2006.01) | |
| *G06T 7/60* | (2017.01) | |
| *G06F 18/00* | (2023.01) | |
| *A63F 3/00* | (2006.01) | |
| *H04N 7/18* | (2006.01) | |
| *A63F 9/24* | (2006.01) | |

(52) U.S. Cl.
CPC .......... *G01B 11/0608* (2013.01); *G06F 18/00* (2023.01); *G06T 7/60* (2013.01); *G07F 17/322* (2013.01); *G07F 17/3206* (2013.01); *G07F 17/3209* (2013.01); *G07F 17/3241* (2013.01); *G07F 17/3293* (2013.01); *A63F 2009/2435* (2013.01); *A63F 2009/2489* (2013.01); *G06T 2207/10024* (2013.01); *G06T 2207/30232* (2013.01); *G06T 2207/30242* (2013.01); *H04N 7/181* (2013.01)

(58) Field of Classification Search
CPC .... G07F 17/3293; A63F 1/06; A63F 3/00157; A63F 2009/2435; A63F 2009/2489; G01B 11/0608; G06F 18/00; G06T 2207/10024; G06T 2207/30232
USPC .......................................................... 463/25
See application file for complete search history.

(56) References Cited

U.S. PATENT DOCUMENTS

| | | | | |
|---|---|---|---|---|
| 8,027,508 | B2* | 9/2011 | Rhoads ................... | G07F 17/32 |
| | | | | 463/16 |
| 8,608,548 | B2* | 12/2013 | Mattice ............... | G07F 17/3251 |
| | | | | 463/43 |
| 9,520,025 | B2 | 12/2016 | Koyama et al. | |
| 10,403,128 | B2* | 9/2019 | Giobbi ................ | G07F 17/3239 |
| 2003/0084596 | A1 | 5/2003 | Zurawski et al. | |
| 2003/0092491 | A1 | 5/2003 | Fujimoto et al. | |
| 2005/0051965 | A1 | 3/2005 | Gururajan | |
| 2005/0258597 | A1 | 11/2005 | Soltys et al. | |
| 2007/0278314 | A1 | 12/2007 | Chapet | |
| 2008/0113783 | A1 | 5/2008 | Czyzewski et al. | |
| 2008/0150678 | A1* | 6/2008 | Giobbi ................... | G08C 17/02 |
| | | | | 340/5.2 |
| 2008/0234052 | A1 | 9/2008 | Steil | |
| 2009/0075725 | A1 | 3/2009 | Koyama | |
| 2009/0233699 | A1 | 9/2009 | Koyama | |
| 2010/0029380 | A1* | 2/2010 | Rhoads ................... | A63F 13/45 |
| | | | | 463/43 |
| 2010/0105486 | A1 | 4/2010 | Shigeta | |
| 2010/0130288 | A1 | 5/2010 | Shigeta | |
| 2010/0210355 | A1 | 8/2010 | Koyama et al. | |
| 2014/0370960 | A1 | 12/2014 | Mosley et al. | |
| 2016/0133123 | A1* | 5/2016 | Giobbi ............... | G07C 9/00182 |
| | | | | 340/5.64 |
| 2018/0075690 | A1 | 3/2018 | Moore et al. | |
| 2018/0322739 | A1* | 11/2018 | Pececnik ............. | G07F 17/3225 |
| 2019/0066438 | A1* | 2/2019 | Yamaguchi ......... | G07F 17/3223 |
| 2020/0234533 | A1* | 7/2020 | Yamaguchi ........... | G07F 17/322 |

FOREIGN PATENT DOCUMENTS

| | | | |
|---|---|---|---|
| CN | 101678233 | A | 3/2010 |
| CN | 103262100 | A | 8/2013 |
| JP | S64-500243 | A | 2/1989 |
| JP | 2003-144742 | A | 5/2003 |
| JP | 2009-018021 | A | 1/2009 |
| JP | 2009-066172 | A | 4/2009 |
| JP | 2010-187807 | A | 9/2010 |
| JP | 5294915 | B | 9/2013 |
| JP | 2015525391 | A | 9/2015 |
| WO | 2008101315 | A1 | 8/2008 |
| WO | 2008/120749 | A1 | 10/2008 |
| WO | 2014/182306 | A1 | 11/2014 |
| WO | 2014182306 | A1 | 11/2014 |

OTHER PUBLICATIONS

International Search Report dated Apr. 25, 2017 issued in corresponding PCT Application PCT/JP2017/002342.
Singapore Office Action dated Oct. 10, 2019 issued in corresponding SG application No. 11201806537Y.
Korean Office Action dated Nov. 22, 2019 issued in corresponding KR application No. 10-2018-7021886.
Chinese Office Action dated Jun. 29, 2021 issued in CN application No. 201780009199.6.

\* cited by examiner

GAME TOKEN MANAGEMENT SYSTEM

CROSS-REFERENCE TO RELATED APPLICATIONS

This application is a continuation of U.S. patent application Ser. No. 17/036,616 filed Sep. 29, 2020, which is a continuation of U.S. patent application Ser. No. 16/073,913 filed Jul. 30, 2018, now issued U.S. Pat. No. 10,861,284, which is a national phase application under 35 U.S.C. § 371 of International Pat. App. No. PCT/JP2017/002342 filed Jan. 24, 2017 which claims priority to JP Pat. App. No. 2016-030443 filed Feb. 1, 2016; the entire contents of each disclosure is specifically incorporated by reference herein without disclaimer.

TECHNICAL FIELD

The present invention relates to a game token management system that prevents the use of forgeries of token in game places in game facilities used in casino or other game token.

BACKGROUND ART

Baccarat and blackjack may be mentioned among many live table games in casino and game facilities. In these games, a standard deck formed of 52 playing cards is used, and playing cards are distributed from a shooter provided with a plurality of previously shuffled decks (6 to 9 or 10 decks) onto a game table for start of the game. In casino or game facilities, game tokens are used in games.

False game tokens should not be used in casino. In order to prevent the use of false game tokens in casino, a technique in which RFID is provided on the game token is adopted in casino. Game tokens attached with RFID are publicly known and are disclosed in International Application Publication WO 2008/120749.

In recent years, manufacturing techniques of false game tokens are progressed to such an extent that truth-or-falsity determination marks and RFIDs can be copied fully accurately. As a result, truth-or-falsity determination marks and RFIDs that are the same as authentic truth-or-falsity determination marks and RFIDs are provided on false game tokens, making it impossible to distinguish false game tokens from true game tokens and making it substantially impossible to perform truth-or-falsity determination.

SUMMARY OF INVENTION

The present invention provides a management system or a game token that can prevent the use of false game tokens used in casino or game facilities and that can prevent the use of false game tokens and unfair exchange in casino or game facilities.

In order to solve the problem of the prior art, according to the present invention, there is provided a game token management system including: game tokens attached with unique ID that is individually identifiable; an ID reading device that reads the unique ID attached to the game token; a storage that holds the game token in a casher in a game place; a game table chip tray that holds the game token in a game table; a chip determination device that specifies a type and number of game tokens held in the game table chip tray and the storage, with the ID reading device; and a management control device that, in the game place, manages the IDs attached to the game tokens on the database, wherein the management control device has a function that previously registers, on the database, the IDs of the game tokens that are contemplated to be used, manages, using the database, at least the IDs of the game tokens present on the game table chip tray and the storage, together with information about location, on the database, specifies the game token in the game table chip tray and the storage at predetermined timing and further retrieves the database and determines the following events by the retrieval of the database: 1) ID absent on the database is newly present and 2) two or more identical IDs are present, and generates an error signal when status 1) or 2) is noticed.

Furthermore, the management control device further includes a function that when there is a change in presence of the game token in at least the game table chip tray and the storage, records a time or a place at which the change has occurred, on the database in association with the ID, retrieves the database, and, when two or more identical IDs are present, extracts and stores the ID and the time or the place recorded in association with the ID on the database from the database, and specifies the time at which the detected game token attached with the ID goes in or goes out the game table chip tray or the storage, or the place of the game table chip tray or the storage in which the game token has been held.

Further, the game token management system may include a bet area chip determination device that specifies the type and numbers of the game tokens bet on a bet area of the game table by the ID reading device, and a function is provided that determines following events by the retrieval of the database also for the ID of the game token present on the bet area of the game table: 1) a fact that ID absent on the database is newly present and 2) a fact that two or more identical IDs are present, and generates an error signal when status 1) or 2) is noticed.

The unique ID is provided at least three places of a side face of the game token. The unique ID has been inkjet-printed with an ink that is viewable in visible light. In particular, a construction in which the unique ID has been provided by a presence or absence of marks in a plurality of lines and a plurality of rows is advantageous. Further, a transparent coating layer or varnish is provided on upper and lower surfaces of the game token.

In order to solve the above problem of the prior art, according to the present invention, there is provided a game token having a construction having a multilayer structure including a plurality of laminated plastic layers having respective different colors, at least one layer being a colored layer, a white layer or a light-color layer being laminated on an outer side of the colored layer, the multilayer structure having a striped pattern on a side face thereof in a laminated direction, the type of the game token being identifiable by the colored layer. Further, the game token has a construction including a unique ID that is provided at at least three places of a white layer on a side face or a side face of a light-color layer, is readable by a ID reading device to identify the type of and information about manufacture of a game token, and can be managed on database. The unique ID may be inkjet-printed with an ink viewable in visible light. The unique ID may be inkjet-printed with an ink unviewable in visible light.

In order to solve the above problem of the prior art, according to the present invention, there is provided a game token including IDs that are each identifiable, wherein the unique ID provided on the game token is read with an ID reading device, the ID reading device can read the game token held in a storage held by a casher in a game place and a game table chip tray in the game table, and, further, the type and number of the game tokens held in the game table chip tray and the storage are specified by a chip determination device through the ID reading device, the ID of the game token present on the game table chip tray and the storage is managed together with information about location on database, at least 1) a fact that ID absent on the database is newly present and 2) a fact that two or more identical IDs are present, are examined, and an occurrence of status 1) or 2) can be determined by the ID.

DESCRIPTION OF EMBODIMENTS

Figure 1:
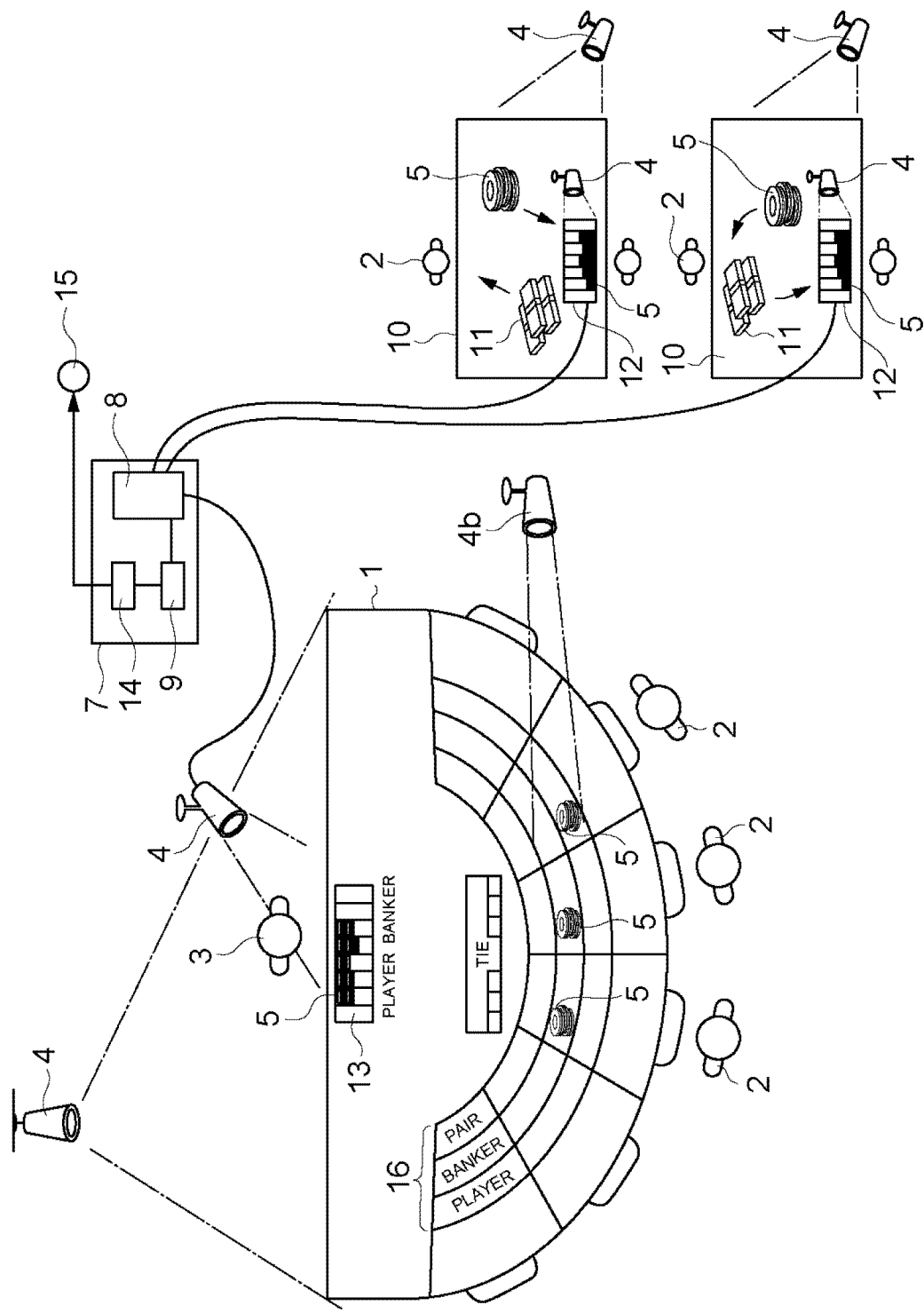
FIG. 1 is a schematic view of the whole management system of a game token in an embodiment of the present invention.

A management system of a game token in a game place having a game table in an embodiment of the present invention will be described. FIG. 1 is a schematic view of the whole management system. A management system of a game token in a game place having a plurality of game tables 1 (only one table in FIG. 1) takes images through a plurality of cameras 4, and stores and manages proceeding of a game in a game table 1, including a game participant 2 and a dealer 3. In particular, the management system of this game token specifies the type and number of game tokens 5 used in the game in the game table 1 by analyzing image information obtained by the camera 4. The game token 5 is attached with a unique ID 6, and the type and number of the game tokens 5 is obtained by determining and reading the ID 6. An ID reading device 8 provided within a management control device 7 connected to the camera 4 analyzes image information obtained from the camera 4 and specifies the ID 6. In particular, the management control device 7 includes in its interior a chip determination device 9 that analyzes image data taken through the camera 4 and, from the results of reading of the ID 6, specifies the type and number of the game tokens 5 that are provided side by side or in a stacked state.

In a casher 10 of a game place, a game token 5 is replaced with cash 11 paid by a game participant 2, and in the casher 10, the game token 5 is stored in a storage 12 that stores the game token 5. Further, in the casher 10 in the game place, the game token 5 brought by the game participant 2 is refunded in cash 11. In a game table 1, the game token 5 is held by a game table chip tray 13. Game tokens 5 bet by a game participant 2 who has lost in each game are collected from the table 1 by the dealer 3 and are returned to the game table chip tray 13. Thereafter, game tokens 5 are redeemed to the game participant 2 who has won the game. Interaction between the game participant 2 and the casher 10 or the dealer 3 in the game place is wholly photographed and recorded by a camera 4. In the storage 12 and the game table chip tray 13, every time when there is an interaction between the game participant 2 and the game token 5, the number of game tokens 5 stored in the storage 12 and the game table chip tray 13 is increased or decreased. The type and number of game tokens 5 held in the game table chip tray 13 and the storage 12 are monitored by the ID reading device 8 and the chip determination device 9 through the camera 4 at predetermined timing or on a steady basis. The management control device 7 previously holds, on database 14, IDs 6 of all the game tokens 5 that are contemplated to be used in the game place (in the game place, IDs 6 of all the game tokens 5 that are contemplated to be used are previously registered).

Thus, the management control device 7 that manages IDs 6 attached to the game token 5 on the database manages, using the database 14 in the game place, at least all the IDs 6 of game tokens 5 present on the game table chip tray 13 and the storage 12 together with information about location (for example, in the storage 12 or the game table chip tray 13, or in transit from a backyard (not shown), or held by the game participant 2 on the database 14. The management control device 7 specifies all the game tokens 5 in the game table chip tray 13 and the storage 12 at predetermined timing or on a steady basis by IDs 6, and further retrieves the database 14 to determine the following events by the retrieval of the database 14.

The following determination is made: 1) a fact that IDs 6 that have been absent (or are absent) in the database 14 are newly present; 2) a fact that two or more identical IDs are present. When the status 1) or 2) is noticed, an error signal that indicates abnormality is generated, and a management section or a security section 15 in the game place is informed of the error signal. The management control device 7 has the above function.

Since the management control device 7 specifies all the game tokens 5 in the game table chip tray 13 and the storage 12 at predetermined timing or on a steady basis by IDs 6 and stores the game token 5 on the database 14, 1) a fact that IDs 6 that have been absent (or are absent) in the database 14 are newly present can be determined. Further, 2) a fact that two or more identical I IDs 6 are present can also be determined.

The management control device 7 further has a function that when there is a change in presence of the game token 5 in at least the game table chip tray 13 and the storage 12, records, on the database 14, a time or a place (the storage 12, the game table chip tray 13, and the like) at which the change has occurred, in association with the ID 6, retrieves the database 14, and, when two or more identical IDs 6 are present, and extracts and stores the ID 6 and the time or the place recorded in association with the ID 6 on the database 14 from the database 14, and specifies, by the database 14, the time at which the detected game token 5 (already used or converted) attached with the ID 6 goes in or goes out the game table chip tray 13 or the storage 13, or the place of the game table chip tray 13 or the storage 13 in which the game token 5 has been held. When the time and the place are specified, for example, a person with suspected misuse of the game token 5 can be specified from the record image of the camera 4.

In the game token management system, the management control device 7 can specify the type and number of game tokens 5 bet on a bet area 16 in the game table 1 by an ID reading device 8. The game token 5 in the bet area 16 is photographed by a camera 4b that particularly takes photographs of the bet area 16, and also for IDs 6 of the game tokens 5 present on the bet area 16 in the game table 1, the following events are determined by the retrieval of the database 14: 1) a fact that ID 6 that has been absent on the database 14 is newly present on the bet area 16; 2) a fact that two or more identical IDs are present. When the status 1) or 2) is noticed, an error signal is generated. The management control device 7 has the above function.

In this system, the management control device 7, the ID reading device 8 provided in the interior of the system, and the chip determination device 9 that specifies the type and number of game tokens 5 have a structure that compositely includes a computer and a program and a memory integrally or as a plurality of constructions.

Figure 2:
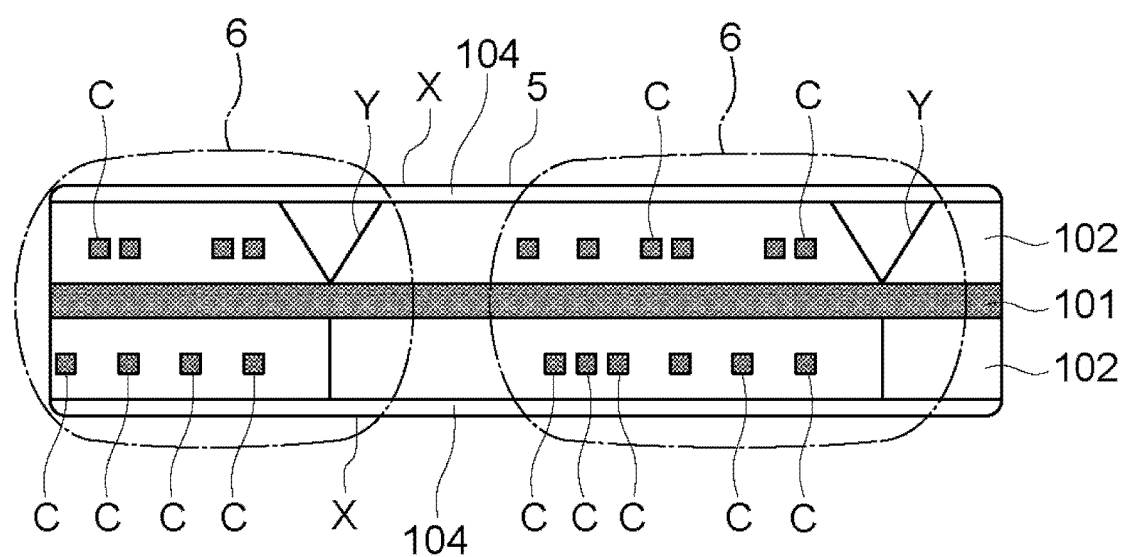
FIG. 2 is a side view of the game token in the embodiment of the present invention.
Figure 3A:
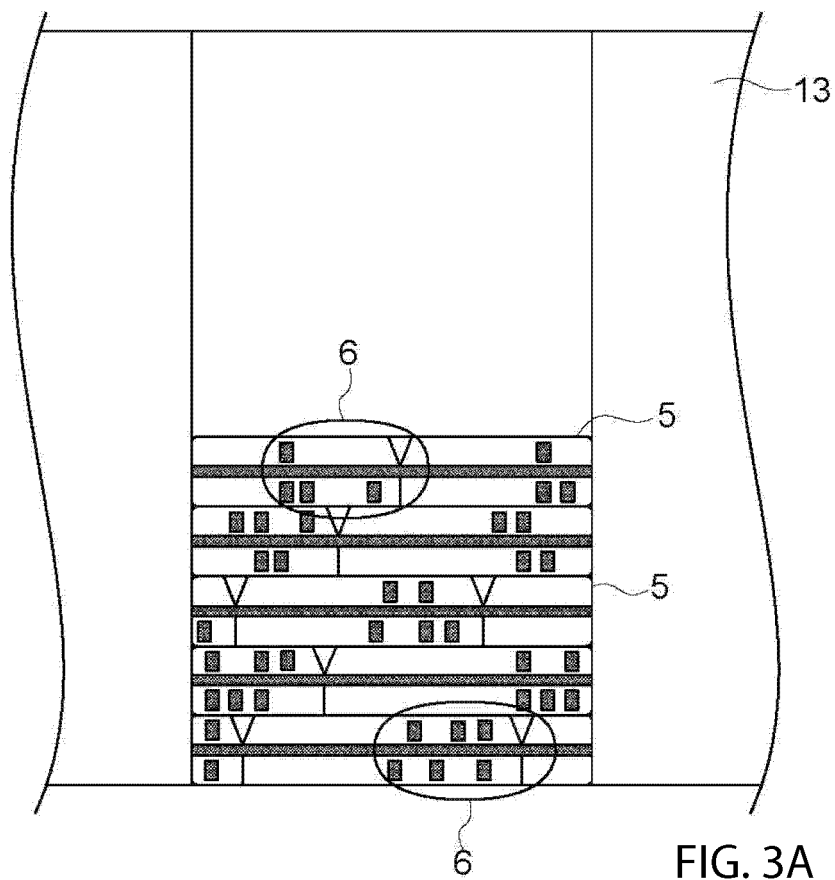
FIG. 3A is a plan view of a principal part of a chip tray that illustrates such a state that game tokens that are one of embodiments of the present invention are held on a chip tray in a casino table.
Figure 3B:
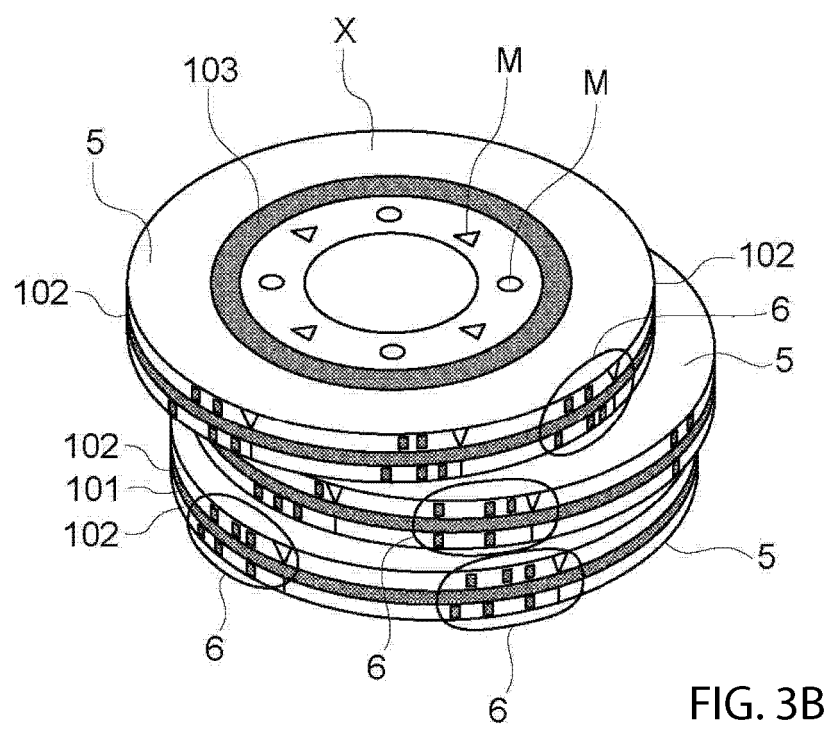
FIG. 3B is a perspective view of the game token stacked on top of another.

Next, the game token 5 (the so-called "chip") used in this system will be described in more detail. FIG. 2 is a front view of a game token 5 (chip) used in the system of the present invention, the game token 5 is formed by laminating a plurality of plastic layers having respective different colors, integrating the laminate, for example, by thermocompression bonding, and punching the laminate into a circular or quadrilateral shape. The game token 5 has a multilayer structure that includes a colored layer 101 at least as an intermediate layer and that includes a white layer 102 or a light-color layer (that is not shown and may be a layer having a lighter color than the colored layer 101) provided between both sides (upper and lower surfaces in FIG. 2) of the colored layer 101 that the intermediate layer. When the multilayer structure including the colored layer 101 and the white layer 102 or the light-color layer (that is not shown and is a layer having a lighter color than the colored layer 101) laminated on both sides of the colored layer 101 that is the intermediate layer is adopted, as illustrated in FIGS. 3A-B, as viewed from the side surface, a striped pattern (in a laminated direction) is formed and the type of game tokens 5 (for example, 10 points, 20 points, 100 points, and 1000 points) can be specified by varying the color of the colored layer 101 (for example, red, green, yellow, or blue).

Further, as illustrated in FIG. 2, in the game token 5, ID 6 indicating the type of the game token 5 is provided on a side face of the white layer 102. A transparent layer 104 is provided on the outermost layer, and the layers are thermocompression-bonded to a structure including at least five layers. These game tokens 5 are formed by using an elongated plastic material, subjecting layers in the elongated state (for example, at least the colored layer 101 and the white layer 102) to thermocompression bonding to form a bonded state (for example, a five-layer structure) and then punching the laminate, for example, by a press into, for example, a circular or rectangular shape. When punching is carried out by pressing, the dimension of a molding die and a punch for punching is designed, and the end of the transparent layer 104 that is the outermost layer is formed in R-shape (round corner). The transparent layer 104 may be a coating layer of varnish. The unique ID 6 is provided at at least three places of a side face of the game token 5. The unique ID 6 has been inkjet-printed with an ink viewable in visible light.

Figure 4:
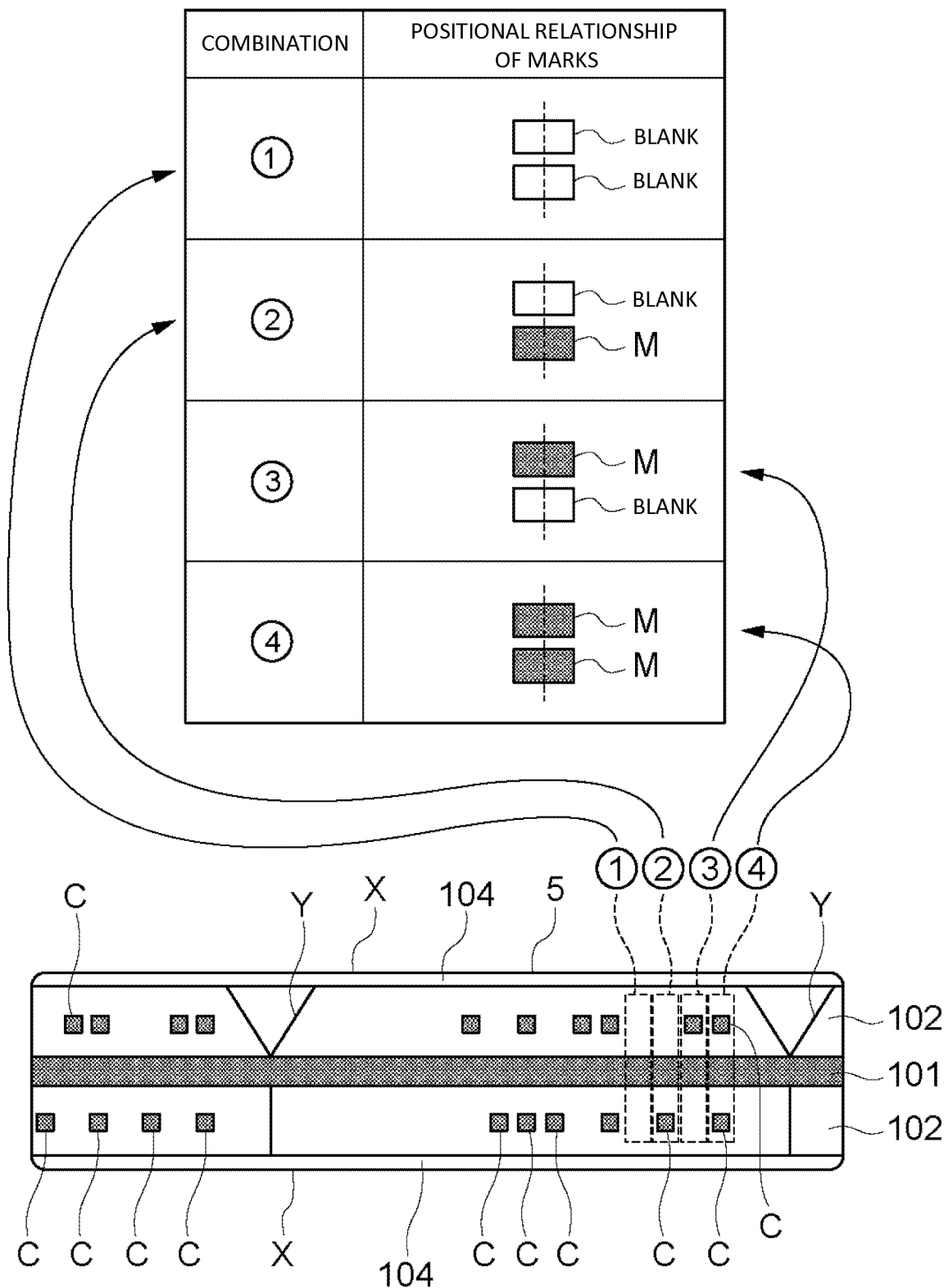
FIG. 4 is an explanation view of IDs (illustrated in codes in a plurality of rows) attached to game tokens in the embodiment of the present invention.

In particular, in the present embodiment, the unique ID 6 is constructed and provided by the absence or presence of mark C provided in a plurality of lines and a plurality of rows. In the marks C in the plurality of lines and the plurality of rows, as illustrated in FIG. 2, upper and lower marks C are paired to construct a code, and, in FIG. 2, a ten-digit code is provided. Pairing of upper and lower marks C to constitute codes (four types) is illustrated in FIG. 4. A character Y located next to the mark C is an identification mark for the identification of upper and lower sides of the mark. The code formed of the mark C is constructed so as to specify a predetermined combination of marks C. As a result, in an embodiment illustrated in FIG. 4, when four types are possible as a combination of marks C in upper and lower two rows, and, when this is printed in 10 rows, codes of the tenth power of the four types can be constructed. In ten-digit codes, since four types are possible, codes of the types of the tenth power of four are obtained. Thus, satisfactory unique IDs 6 of game tokens 5 can be provided.

The game token 5 in the present embodiment has a construction having a multilayer structure including a plurality of laminated plastic layers having different colors, at least one layer being a colored layer 101, a white layer 102 or a light-color layer being laminated on an outer side of the colored layer 101, the multilayer structure having a striped pattern on a side face thereof in a laminated direction, the type of the game token 5 being identifiable by the colored layer 101. The unique ID 6 is provided at at least three places (desirably six places) on a side face of the white layer 102 or the light-color layer. In the present embodiment, six IDs are provided while providing a predetermined spacing at 60 degrees in a rotating direction. In the game token 5, unique IDs 6 that are individually identifiable (different from each other one by one) are provided while providing a predetermined spacing at 60 degrees in a rotating direction so that IDs 6 can be necessarily viewed from the side. The unique ID 6 provided on the game token 5 is read by the ID reading device 8. For example, the type and information about manufacture of the game token 5 can be specified by reading the ID 6 with the ID reading device 8, and the ID 6 can be managed on the database 14. In the present embodiment, the unique ID has been inkjet-printed with an ink viewable in visible light. The unique IDs 6 may be attached by inkjet printing with inks (UV ink, carbon black ink or infrared reaction ink) which are not visible with visible light.

The unique IDs 6 attached to the game token 5 are read by the ID reading device 8, the ID reading device 8 can read game tokens 5 held in the storage 12 held by the casher in the game place and the game table chip tray 13 in the game table, and, in fact, even when game tokens 5 are stacked horizontally (laterally) as illustrated in FIG. 3A, the IDs 6 can be read.

Further, in the game token 5, a mark M formed of UV ink or carbon black ink is provided on a surface (X) of the white layer 102. This mark M is provided for the indication of truth or falsity of the game token 5. When the mark M is exposed to ultraviolet light (or infrared light), the mark M can be viewed with the naked eye. An authentic game token can be determined by combining the shape and number of marks. A transparent layer 104 is thermocompression-bonded or coated as an outermost layer so as to cover a print 103 (for example, 100 points) or mark M for game place specifying purposes on the surface of the game token. The transparent layer 104 is subjected to embossing or varnish processing to prevent mutual intimate contact of the game token 5 or to improve slipperiness.

The end of the transparent layer 104 that is the outermost layer on which the print 103 (for example, 100 points) is formed in R-shape (R) to prevent appearance of the white layer 102 on the side surface due to deformation of the surface of the white layer 102 in the step of punching of a game token 100. Further, this prevents a sharp end of the game token 100 from damaging hands or other chips T. The colored layer 101 may be formed of one colored layer or a plurality of colored layers. In order to increase the weight, metal or ceramics may be incorporated within the layer constituting the colored layer 101. Further, a part of the colored layer 101 may be bored, or alternatively a space may be provided between the colored layer 101 and the white layer 102, followed by incorporation of RFID in the space. In this case, a combination of IDs by the mark C-derived codes and RFID is adopted as the ID 6 of the game token 5.

In the game token 5 thus constructed, the type and number of game tokens 5 held in the game table chip tray 13 and the storage 12 are specified by the chip determination device 9 through the camera 4 and the ID reading device 8, and IDs 6 of game tokens 5 present on the game table chip tray 13 and the storage 12, together with information about location, are managed on the database 14. This makes it possible to examine at least the following events: 1) a fact that ID 6 that has been absent on the database 14 is newly present; and 2) a fact that two or more identical IDs are present. The occurrence of the status 1) or 2) can be realized by the retrieval and determination of all the IDs 6.

The management control device 7 may be a control device having an artificial intelligent-type or deep-learning-type structure. The management control device 7 can grasp a position 24 (a position where the token is bet to a player, a banker, or a pair), the type (different values are allocated for each color in the game token), and the number of game tokens 5, using, for example, artificial intelligence-type computers or control systems, deep-learning (structure) techniques, and self-learning functions.

Figure 5:
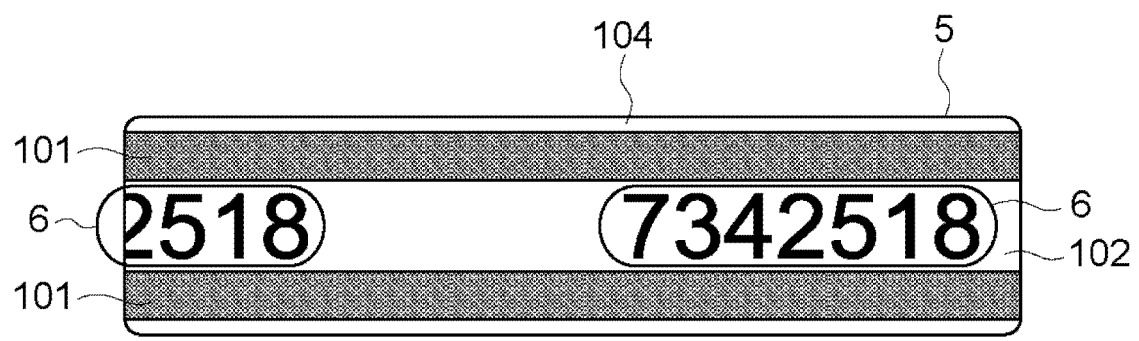
FIG. 5 is a side view of ID attached to a game token in another embodiment of the present invention.

Variants of the game token 5 will be described. In a variant, a seven-digit figure is printed as ID 6 on a side face of the game token 5. In an embodiment illustrated in FIG. 5, a white layer 102 is provided in the center, and a colored layer 101 is provided on upper and lower surfaces of the white layer 102. A figure is printed as a mark in the white layer 102 that is the center to constitute ID 6. A combination of 10 figures is possible, and, when the combination of figures is printed by digit printing, codes of the seventh power of the 10 figures can be constructed, making it possible to impart satisfactory unique IDs 6 of the game token 5. In the camera 4 and image analyses, reading of determination and reading of figures is sometimes difficult, and a combination of marks C in embodiments described above is advantageous in terms of image analysis.

REFERENCE SIGNS LIST 5 game token
6 ID
7 management control device
8 ID reading device
9 chip determination device
12 storage
13 chip tray
14 database
M mark

The invention claimed is:

1. A management system for managing gaming chips at a casino, the management system comprising:
   a cashier including a storage area in which the gaming chips are held;
   a gaming table tray configured to hold the gaming chips at a game table;
   an ID reader configured to read IDs provided on the gaming chips;
   a chip determination device configured to use the ID reader to identify the IDs of the gaming chips in at least the gaming table tray and the cashier; and
   a database configured to record the IDs of the gaming chips determined by the chip determination device along with their location information,
   wherein the management system is configured to use the database to determine the gaming chips owned by the casino, including the gaming chips existing in the gaming table tray and the gaming chips existing in the cashier.

2. The management system according to claim 1, wherein the gaming chips for amusement use held by the casino include substitute coins for amusement use that are being moved from a back yard of the casino.

3. The management system according to claim 1, wherein:
   the ID reader is provided in the cashier,
   the chip determination device is configured to identify, using the ID reader, the IDs of the gaming chips to be exchanged for cash paid by a game participant at the cashier, and
   the management system further comprises a control device configured to record the exchange at the cashier in a manner that enables the game participant to be identified, and to record the game participant in the database as the location information along with the IDs of the gaming chips.

4. A management system for managing gaming chips at a casino, the management system comprising:
   a cashier including a storage area in which the gaming chips are held;
   a gaming table tray configured to hold the gaming chips at a game table;
   an ID reader configured to read IDs provided on the gaming chips;
   a chip determination device configured to use the ID reader to identify the IDs of the gaming chips in at least the gaming table tray and the cashier; and
   a database configured to record the IDs of the gaming chips determined by the chip determination device along with their location information,
   wherein the management system is configured to use the database to determine the gaming chips owned by a game participant.

5. The management system according to claim 4, further comprising:
   a recording device configured to record:
      1) an exchange between the gaming chips and cash made by the game participant; and
      2) collection of the gaming chips from to the game participant and redemption of the gaming chips to the game participant based on a result of game.

6. The management system according to claim 5, wherein a control device of the management system is configured to identify, based on a record of the recording device in response to fraud being suspected, the game participant who performed 1) the exchange or 2) the collection.

7. A management system for managing gaming chips at a casino, the management system comprising:
   a cashier including a storage area in which the gaming chips are held;
   a gaming table tray configured to hold the gaming chips at a game table;
   an ID reader configured to read IDs of the gaming chips in the cashier and the gaming table tray;
   a chip determination device configured to uses the ID reader to identify at least the IDs of the gaming chips held in the gaming table tray and the cashier;
   a database configured to record location information of the gaming chips, including the cashier, the gaming table tray, and game participants, based on the IDs identified by the chip determination device, along with the IDs of all gaming chips that are expected to be used in the casino; and a control device configured to identify a suspicion of fraud with respect to the gaming chips based on the location information recorded in the database, and to identify a person pertaining to the suspicion of fraud.

8. A management system for managing gaming chips at a casino, the management system comprising:

a reader configured to:
 acquire IDs of the gaming chips at a cashier including a storage area in which at least the gaming chips are held, and
 acquire the IDs of the gaming chips to be exchanged for cash paid by game participants at the cashier;

a database configured to record the IDs of the gaming chips that are expected to be used in the casino, along with location information of the gaming chips; and a control device configured to record the exchange at the cashier in a manner that enables the game participant to be identified, and to record the game participant in the database as the location information along with the IDs of the gaming chips.

\* \* \* \* \*